_United States Patent Office_

3,257,380
Patented June 21, 1966

3,257,380
PROCESS OF IMPROVING GUMS AND PRODUCT
OBTAINABLE THEREBY
Richard G. Schweiger, San Diego, Calif., assignor to Kelco Company, San Diego, Calif., a corporation of Delaware
No Drawing. Filed Nov. 26, 1962, Ser. No. 240,125
11 Claims. (Cl. 260—209)

This invention relates to polysaccharide gums, and more particularly to a process of improving their dispersibility in water, and to the products obtainable by the inventive process.

Polysaccharide gums are commonly furnished in particulate form, with the particle size generally ranging from as coarse as 20 mesh (U.S. standard sieve) to about 200 mesh. For convenience particles within this range will occasionally hereinafter be referred to as granules. The very property which makes such polysaccharide gums useful, viz., that of thickening aqueous systems, leads to difficulty when such granulated gums are added to water. There is a tendency for the individual particles to undergo surface swelling and stick to each other, generally trapping air inside an aggregate of partially swollen gum granules. These aggregates, or simply "lumps," are very resistant to further dispersion in the water or other aqueous system, because the entrapped air bubbles resist the penetration of water, and indeed, even when air is not present within the lumpy aggregates, simply because the ingress of water into the interior of a large lump of water swellable material is correspondingly slower than into a small particle of the same substance. Various stratagems have been developed to overcome the lumping tendency just described. For example, the granulated gum may be pre-mixed with other dry additives such as sugar, salts, starch, flour, and the like, to reduce the lumping tendency. This has the disadvantage that relatively large amounts of some additional material is necessary. The formulation in which the gum is to be used may not permit the use of the desired or necessary quantities or even types of such additives.

Resort is occasionally made to the use of small amounts of borax or to treatment with formaldehyde in order to get temporary insolubility. This has the disadvantage that the product usually changes properties in an irreversible manner, with the final solubility generally being greatly reduced, and moreover it leads to the inclusion of a material which may be highly undesirable in the finished product.

An object of the present invention is to provide a method for treating granular polysaccharide gums so as to furnish a product which is readily dispersible in water.

Another object of the invention is to provide a process of improving the water dispersibility of granular polysaccharide gums while leaving their final properties including their water solubility substantially unchanged.

A further object is to provide a method of treating the surface only of granules of a polysaccharide gum without affecting the inner part of the granules.

Other objects of the invention will appear as the description thereof proceeds.

Generally speaking, and in accordance with an illustrative embodiment of my invention, I subject granules of a polysaccharide gum to periodic acid under such conditions that the surface of the granule is mildly oxidized. A preferred method of carrying this out is to dissolve the periodic acid in a solvent in which the gum does not swell, and which of course both dissolves the periodic acid and is inert to the latter. That is, the solvent is such that the periodic acid is stable when in solution therein. The gums forming the class described and claimed herein have adjacent hydroxyl groups—that is, they are glycols in the more restricted sense of that term, viz., they possess hydroxyl groups on two adjacent carbon atoms of an essentially aliphatic chain or ring— and the surface treatment with the periodic acid forms aldehyde groups from such adjacent hydroxyl groups. These presumably form weak semi-acetal bondings with free hydroxyl groups or perhaps hydrogen bridge bondings which open easily in the presence of water. It will be understood that in presenting these hypotheses I do not wish to be bound by any theory of operation. Nevertheless the result is that a temporary short-lasting insolubility in water is imparted to the surface layer thus treated. When the granules of the polysaccharide gum are added to water, the effect is initially approximately the same as adding any other inert granular material such as, for example, fine sand to the water. The individual granules enter the water without clumping together and thus with no formation of lumps. Since each particle is individually surrounded by water on all sides, and since the insolubility imparted by the periodic acid treatment disappears rapidly in the presence of the water, the individual granules soon begin to swell, generally within ten or twenty seconds after the initial addition thereof to the water. A clear solution of the gum is then obtained within one or two or three minutes depending upon the polysaccharide, its particle size, the temperature of the water, and other usual conditions. The polysaccharide gums which are useful in accordance with my invention are the following: algin gums, by which term I include all of the water soluble alginates such as sodium alginate, lithium alginate, potassium alginate, and the like; pectate gums, by which term I include all of the pectate substances which of themselves will dissolve in water; cellulose gums, which is the term generally and commercially applied to those cellulose derivatives which dissolve in water in the same fashion as the natural water dispersible gums, and which include sodium carboxymethylcellulose, lithium carboxymethylcellulose, hydroxyethylcellulose, and the like; and the natural gums known as guar, arabic, tragacanth, and karaya. However, all other gums and polymers with adjacent hydroxyl groups may be treated accordingly.

I have found that in the case of algin, pectate, and cellulose gums, about 3% to 6% by weight of the gum of periodic acid ($H_5IO_6$) is best, although higher quantities may be used. In the case of guar, arabic, tragacanth, and karaya gums, it turns out that the preferred and best amount of periodic acid is considerably lower, namely 0.03% to 0.4% of the weight of the gum. In the case of these four gums, heavy treatment with periodic acid, such as for example 2% by weight, may lead to permanent insolubilization of the gum.

Since the invention is based on what is essentially a surface treatment, I shall point out a few helpful considerations in the practice of the invention:

First of all, the individual granules, for best results, should be solid, and not porous. This is indeed the case with all of the common gums, such as for example gum tragacanth. When granules of such gums are observed under the microscope at low power, they appear as translucent fragmented solids. Some processes for obtaining gums, particularly the synthesized gums, may include precipitation of the gum with alcohol from a water solution, which may lead to particles which are essentially porous. Since the interior of these pores are likewise surfaces, they will be oxidized by the periodic acid and this will lead to excessive consumption of this reagent. Accordingly I prefer to work with nonporous granules.

Second, from the ordinary formulation for the calculation of the surface area and the volume of a sphere, it is apparent that as the radius of a particle is reduced to one-half, for example, the surface per unit weight is doubled. Thus, proportionately larger amounts of periodic acid will be required for treatment of a given gum when the granules are mostly 200 mesh, than when the granules are mostly 10 or 20 mesh.

Third, it should be kept in mind that agitation during the treatment of the granules with periodic acid may expose fresh surfaces of the granules, and thus lead to excessive consumption of the reagent. Thus any grinding action should be avoided during this stage of the treatment.

The reaction is usually carried out by suspending the granular polysaccharide gum in a suitable solvent, such as methanol-water, the methanol being the major ingredient, such as 50% to 90% methanol but preferably 70% to 80%. Then the periodic acid, dissolved in the same solvent, is added and the mixture is shaken slightly for one-half to one hour. If desired, the periodic acid may be added first. Where the gum is anionic such as is the case with algin gums, pectate gums, and cellulose gums, a trace of acetic acid may be added to prevent a possible precipitate of iodate or periodate. Other solvents may be used, either by themselves or with a minor proportion of water being present. Useful solvents are ethanol, propanol, isopropanol, and dioxane.

The product is recovered by filtering it off and washing with alcohol. In the case of anionic material a trace of ammonium hydroxide may be included to offset the acetic acid previously mentioned.

The dispersibility of the so-treated gum is greatly improved immediately after the reaction has been described. However, I have determined that the dispersibility is improved thereafter by simple standing. It appears to reach a maximum within about fifteen to twenty days after treatment, and does not thereafter decrease. In an ordinary commercial operation, at least fifteen to twenty days will ordinarily elapse between treatment and use at the final destination, so that no especial steps need be taken to take advantage of this natural improvement with time.

Usually the treated gum absorbs 7%–12% of the iodine in the form of iodate or iodic acid. Even several washings with aqueous alcohol cannot remove it quantitatively. However, a treatment with a calculated amount of $SO_2$ in aqueous methanol transforms the iodate into iodide which is alcohol-soluble and as such can be readily removed by washing with aqueous alcohol. In the experiments below the amount of $SO_2$ was measured conveniently by weighing the proper quantity of $Na_2S_2O_5$, dissolving it in aqueous methanol, and adding the stoichiometric amount of hydrochloric acid to liberate the $SO_2$. In this solution the product to be treated was suspended. However, in a commercial production the $SO_2$ may be introduced directly. The amount of $SO_2$ is preferentially between 2.2 to 2.5 moles/mole of $NaIO_3$ retained. If it is considerably less some of the iodate will not be reduced and stay with the product; if it is considerably more the bisulfite will undergo further reaction with the aldehyde groups forming the common bisulfite addition compound. Then semi-acetal bondings apparently cannot be formed and no improvement of the dispersibility is obtained. The reduction is carried out in aqueous methanol, or other solvent as already mentioned, the concentration of which is about 10% lower than during the oxidation.

In the following numerous examples it is demonstrated how to carry out my invention.

The dispersion tests in all examples were made by adding one heaping teaspoonful of the polysaccharide to be tested to 250 cc. of distilled water immediately followed by slow stirring with the spoon for 30 seconds. The lumps left were counted and their number was taken as an estimate for the dispersibility. So, the higher the number, the less dispersible is the product; the number 0 indicates a perfect dispersibility.

EXAMPLE I 10 g. samples of sodium alginate: (a) high viscosity, through 28 mesh; (b) medium viscosity, through 40 mesh; (c) low viscosity, through 40 mesh, and (d) extra low viscosity, through 40 mesh were suspended in 50% methanol. After the addition of 0.3 g. of periodic acid ($H_5IO_6$) as a solution in 50% methanol to each sample it was lightly shaken for about 15–30 min. The solvent was filtered off, the product washed with 50% methanol several times then with 100% methanol and finally dried on a Büchner funnel. Most samples developed a slight haze toward the end of the reaction which probably was due to the formation of sodium iodate which is insoluble in alcohol. After keeping for one day the following results for the dispersion tests were obtained:

|     | Control | Treated |
| --- | --- | --- |
| (a) | 11 | 0 |
| (b) | 8 | 1 |
| (c) | 13 | 1 |
| (d) | 6 | 0 |

The lumps from treated materials were soft and probably would have dissolved when stirred for a few more minutes. Most of the lumps from the controls were medium to large and part of them were dry inside.

All samples contained iodine in the form of iodate which probably was absorbed during the oxidation. This was tested by dissolving a small sample in water, adding some potassium iodide and acidifying with sulfuric acid. A yellow to brown color developed if iodine was present.

Two of the above samples were suspended in 50% methanol. Into one sample very little $SO_2$ and into the second one an excess of $SO_2$ was introduced. After filtering off the liquid and washing the solids with 50% methanol Sample I still contained a trace of iodine while the second sample was free of iodine. However, the dispersibility of Sample II was not improved and the dispersion value was the same as that of its control.

EXAMPLE II 30 g. of sodium alginate was suspended in 70 cc. of 60% methanol to which a solution of 1 g. of periodic acid was added. The mixture was kept for about 40 minutes and frequently shaken, then the liquid was filtered off, the product washed with 60% methanol and finally with pure methanol and dried on a Büchner funnel.

The amount of iodate was determined as follows: A portion of 0.2–0.3 g. of the sample was dissolved in water, potassium iodide was added, and the solution was acidified with diluted sulfuric acid. The free iodine was titrated with 0.1 N sodium thiosulfate using thiodene as indicator. From this titration value obtained, the amount of $NaIO_3$ in the total sample and the percentage of $H_5IO_6$ retained were calculated.

I. In this experiment 30 g. of sodium alginate (high viscosity) was used for the oxidation. Found were 3.5 mequ. $I_2$/30 g. of product which corresponds to 0.585 mmole $NaIO_3$ or with a 13.3% retention. For the reduction 0.88 mmole $Na_2S_2O_5 = 0.167$ g. was dissolved in water then diluted with the same volume of methanol. Then 17.6 cc. of 0.1 N HCl diluted with 1 volume of methanol was added. In this solution the sample was suspended and agitated slightly for about 30 minutes. The product was filtered off, washed with 50% methanol and finally with pure methanol to which some $NH_3$ was added. After drying the titration still indicated 0.341 mequ. $I_2$/30 g. corresponding to 0.057 mmole $NaIO_3$ or 1.3% retention.

II. 30 g. of sodium alginate (extra low viscosity) was oxidized under the same conditions. The amount of iodine retained was 4.02 mequ./30 g. of product corresponding to 0.671 mmole $NaIO_3$. 1.17 mmole = 0.222 g. of $Na_2S_2O_5$ was used for the reduction. After this treatment 0.885 mequ. $I_2$/30 g. 0.148 mmole $NaIO_3$ was still present.

III. 30 g. of sodium alignate (extra low viscosity) was treated with periodic acid as described above. The amount of iodine retained was 4.21 mequ./30 g. of product or 0.703 mmole $NaIO_3$ corresponding to 16% retention. For the reduction 2.11 mmole=0.4 g. of $Na_2S_2O_5$ and the equivalent amount of 0.1 N HCl were used. Tests for the presence of iodate and iodide were negative.

IV. 30 g. of sodium alignate (high viscosity) was treated as described above. 2.54 mequ. $I_2$/30 g. was retained; 1.27 mmole $Na_2S_2O_5$ was used to reduce the iodate. The final product did not contain any iodine in any form.

V. The example above was repeated using (a) sodium alginate, medium viscosity, and (b) sodium alginate, low viscosity. 3 mmole of $Na_2S_2O_5$/mole of retained $NaIO_3$ was used as described above. No iodine was found after the reduction.

The dispersion tests gave the following results:

|  | Control | Treated |
| --- | --- | --- |
| I | 11 | 1 |
| II | 10 | 1 |
| III | 10 | 0 |
| IV | 11 | 0 |
| V (a) | 8 | 1 |
| V (b) | 13 | 3 |

EXAMPLE III 20 g. portions of sodium alignate (through 40 mesh) were oxidized using 0.1, 0.25, 0.5, 1.0, and 1.5 g. of periodic acid. The oxidation was performed in 60% methanol to which 2 mole HAc/mole $H_5IO_6$ was added. After 40 minutes of mild shaking the liquid was removed, the solids were washer with 60% methanol a few times followed by washing with 100% methanol and air dried on a Büchner funnel. The amount of iodate retained was determined as described above and the reduction was carried out in 50% methanol using 2.5 moles $Na_2S_2O_5$/mole $NaIO_3$ with the equivalent amount of hydrochloric acid. After 40 minutes with occasional mild shaking the solvent was filtered off, the sample washed with 50% and finally pure methanol. The last 50% methanol portion 1–2 cc. of conc. $NH_3$ was added. All samples were free of iodine.

The following table shows mequ. $I_2$ titrated/20 g. of product and the corresponding amounts of $NaIO_3$, the percentage of retained $H_5IO_6$ and the weight of $Na_2S_2O_5$ used.

| Gram $H_5IO_6$ used | Meq. $I_2$ | Mmole $NaIO_3$ | Percent $H_5IO_6$ ret. | Gram $Na_2S_2O_5$ |
| --- | --- | --- | --- | --- |
| 0.1 | 0.252 | 0.042 | 8.7 | 0.029 |
| 0.25 | 0.25 | 0.042 | 3.8 | 0.029 |
| 0.5 | 1.2 | 0.2 | 9.1 | 0.095 |
| 1.0 | 1.81 | 0.32 | 7.3 | 0.143 |
| 1.5 | 3.9 | 0.65 | 9.9 | 0.309 |

The dispersion tests were as follows:

| Sample | Dispersion | |
| --- | --- | --- |
| | After 1 day | After 4 days |
| Control | 15 | 15. |
| 0.1 g. $H_5IO_6$ | 12 | 1 (large). |
| 0.25 g. $H_5IO_6$ | 5 | 1 (medium). |
| 0.5 g. $H_5IO_6$ | 3 | 1 (small). |
| 1.0 g. $H_5IO_6$ | 0 | 0. |
| 1.5 g. $H_5IO_6$ | 0 | 0. |

The amount of haze in 1% aqueous solutions of the treated products did not differ from that of the control. The viscosity dropped only slightly with increasing amount of oxidant.

EXAMPLE IV

I. 30 g. of sodium alginate (through 40 mesh) was treated in 90% methanol as described above. The reduction was carried out in 80% methanol. The results are shown in the following table:

| Gram $H_5IO_6$ used | Meq. $I_2$/30 g. | Percent $H_5IO_6$ ret. | Gram $Na_2S_2O_5$ |
| --- | --- | --- | --- |
| 0.15 | Sm. trace | | 0.040 |
| 0.375 | Trace | | 0.040 |
| 0.75 | 1.05 | 5.3 | 0.042 |
| 1.5 | 3.06 | 7.75 | 0.118 |

DISPERSION

| Gram $H_5IO_6$ used | 1 day | 4 days | 14 days | Vis. (cps.) |
| --- | --- | --- | --- | --- |
| 0 (control) | 16 | 16 | 16 | 340 |
| 0.15 | 16 | 14 | 9 | 400 |
| 0.375 | 14 | 8 | 8 | 310 |
| 0.75 | 12 | 7 | 5 | 348 |
| 1.5 | 0 | 0 | 0 | 368 |

II. This oxidation was carried out with 30 g. of sodium alginate (through 40 mesh screen) in 75% methanol and the reduction in 65% in the way described above.

| Gram $H_5IO_6$ used | Meq. $I_2$/30 g. | Percent $H_5IO_6$ ret. | Gram $Na_2S_2O_5$ |
| --- | --- | --- | --- |
| 0.15 | 0.522 | 13.2 | 0.042 |
| 0.375 | 1.06 | 10.8 | 0.084 |
| 0.75 | 1.53 | 7.75 | 0.121 |
| 1.5 | 2.83 | 7.17 | 0.169 |

DISPERSION

| Gram $H_5IO_6$ used | 1 day | 4 days | 14 days | Vis. (cps.) |
| --- | --- | --- | --- | --- |
| 0 (control) | 12 | 12 | 12 | 340 |
| 0.15 | 11 | 13 | 12 | 296 |
| 0.375 | 8 | 3 | 3 | 316 |
| 0.75 | 2 | 0 | 1 | 288 |
| 1.5 | 0 | 1 | 0 | 386 |

EXAMPLE V 200 g. of sodium alginate was oxidized with 10 g. of $H_5IO_6$ in 70% methanol. The reduction and neutralization was carried out in 60% methanol.

Dispersion after one or more days: 0 (control: 13) In order to prove whether the dispersibility is improved on storage at room temperature another test was conducted as follows:

1 cc. (approximately 0.65 g.) of the treated alginate was poured from a 5 cc. beaker at once into a 150 cc. beaker containing 50 cc. of distilled water. After waiting a certain time which was determined by a stop watch the mixture was stirred with a spatula in order to obtain dispersion. The table below gives the optimum time in seconds after which complete dispersion still could be obtained.

| Time of storage (days) | 1 | 2 | 3 | 6 | 13 | 23 | 35 |
| --- | --- | --- | --- | --- | --- | --- | --- |
| Time elapsed before stirred (sec.) | 4 | 6 | 6–7 | 7–8 | 9–10 | 10–11 | 10–11 |

EXAMPLE VI

I. Pectin LM was mixed with little water, wormed, dried, milled, and passed through a 40 mesh screen. 20 g.

of this material was oxidized with 0.2, 0.5, and 1.0 g. of $H_5IO_6$ in 80% methanol. The reduction and treatment with $NH_3$ was carried out in 70% methanol. The procedure was the same as described above. Results are shown in the following table. Dispersions were measured after 2 days of storage.

| Gram $H_5IO_6$ used | Meq. $I_2$/20 g. | Percent $H_5IO_6$ ret. | Gram $Na_2S_2O_5$ | Dispersion |
|---|---|---|---|---|
| 0 (control) | | | | 15 |
| 0.2 | 1.5 | 28.5 | 0.119 | 7 |
| 0.5 | 3.75 | 28.6 | 0.298 | 0 |
| 1.0 | 18.2 | 76.0 | 1.44 | 0 |

II. Portions of 20 g. of CMC (sodium carboxymethyl cellulose) (passing a 40 mesh screen) were oxidized in 80% methanol using 0.2, 0.5, and 1.0 g. of $H_5IO_6$. The reduction and neutralization were carried out in 70% methanol:

| Gram $H_5IO_6$ used | Meq. $I_2$/20 g. | Percent $H_5IO_6$ ret. | Gram $Na_2S_2O_5$ | Dispersion |
|---|---|---|---|---|
| 0 (control) | | | | 11 |
| 0.2 | 0.25 | 4.75 | 0.020 | 13 |
| 0.5 | 0.704 | 5.35 | 0.056 | 9 |
| 1.0 | 0.78 | 2.96 | 0.063 | 0 |

III. CMHEC (carboxymethyl hydroxyethyl cellulose) (through a 40 mesh screen) was oxidized in 80% and reduced in 70% methanol. For 20 g. of CMHEC, 0.5 g. and 1.0 g. of $H_5IO_6$ were used.

| Gram $H_5IO_6$ used | Meq. $I_2$/20 g. | Percent $H_5IO_6$ ret. | Gram $Na_2S_2O_5$ | Dispersion |
|---|---|---|---|---|
| 0 (control) | | | | 50–60, floats. |
| 0.5 | 2.42 | 18.4 | 0.20 | 7. |
| 1.0 | 8.08 | 30.7 | 0.64 | 2. |

EXAMPLE VII

Portions of 20 g. of guar gum (through a 40 mesh screen) were oxidized in 80% methanol with 1.0, 0.5, 0.2, 0.1, 0.05, 0.025, and 0.0125 g. of $H_5IO_6$. No acetic acid was added during the oxidations. The reduction was performed using 2.5 mmole of $Na_2S_2O_5$/mmole of $NaIO_3$ in 7% methanol. No $NH_3$ was added to the last washing with methanol. All samples showed excellent dispersibility in hot or cold water and milk. The samples with higher quantities of $H_5IO_6$ were not completely soluble. The sample with 0.025 g. of oxidant showed only a slight increase in haze when compared with the control while the sample with the lowest level of oxidant did not differ from the control.

EXAMPLE VIII

A portion of 144 g. of guar gum with 80–150 mesh was oxidized with 0.013 g. of $H_5IO_6$/20 g. Thus 0.0936 g. of periodic acid was used totally. The concentration of the methanol for the oxidation was 80%, for the reduction 70%. 0.057 g. of $Na_2S_2O_5$ was used to reduce the retained 0.727 mequ. of $I_2$ which corresponds to 0.121 mmole of $NaIO_3$ or to 29.5% $H_5IO_6$ retained. The sample showed a perfect dispersibility in hot or cold water and milk and did not otherwise differ from the control.

EXAMPLE IX 10 g. portions of gum arabic, 80–140 mesh, were oxidized in 80% methanol using 0.05, 0.025, 0.0125, 0.009 and 0.00625 g. of $H_5IO_6$. The final product was washed with 80% and then with pure methanol to the last portion of which some ammonium hydroxide was added. The reduction with $SO_2$ was omitted because of the small quantities of periodic acid used. The dispersion tests were as follows:

| Gram $N_5IO_6$ used | Dispersion |
|---|---|
| 0.05 | 0. |
| 0.025 | 1 (very small). |
| 0.0125 | 2 (medium), 2 (small). |
| 0.009 | 3 (large), 11 (small). |
| 0.00625 | 4 (large), 16 (small). |

The haze in the solutions increased with increasing amount of oxidant.

EXAMPLE X 10 g. portions of gum karaya, 80–140 mesh, were oxidized as described above using 0.05, 0.035, 0.025, 0.0125 and 0.00625 g. of $H_5IO_6$. The dispersion tests were as follows:

| Gram $H_5IO_6$ used | Dispersion |
|---|---|
| 0.05 | 0. |
| 0.035 | 3 (medium), 10 (very small). |
| 0.025 | 1 (very large), 20 (small). |
| 0.0125 | 5 (large), 16 (small). |
| 0.00625 | 5 (large), 19 (small). |

The solution did not show any considerable increase in haze with increasing amounts of oxidant. However, the sample with the highest level of oxidant initially had a slightly grainy appearance which disappeared on standing or stirring.

While I have described my invention in terms of specific ingredients, specific conditions, and the like, it will be appreciated that the invention is a broad one and numerous modifications may be made in details, all within the scope of the claims which follow.

What I claim is:

1. The process of improving the water dispersibility of a granulated polysaccharide gum which comprises: placing granules of said gum in a liquid in which said gum does not swell and in which periodic acid is stable; adding periodic acid to said liquid in any sequence of steps; and removing said granules from said liquid after a sufficient time has elapsed for surface reaction of said periodic acid with said gum.

2. The process of claim 1 in which said gum is chosen from a class consisting of algin gums, pectate gums, cellulose, gums, guar gum, arabic gum, tragacanth gum, and karaya gum.

3. The process of claim 2 in which said gum is an algin gum.

4. The process of improving the water dispersability of a granulated polysaccharide gum which comprises: placing granules of said gum in a liquid in which said gum does not swell and in which periodic acid is stable; adding periodic acid to said liquid in any sequence of steps; removing said granules from said liquid after a sufficient time has elapsed for surface reaction of said periodic acid with said gum; and thereafter treating said granules with a reducing agent to reduce residual amounts of periodate and iodate to alcohol soluble iodide and to remove this from said granules.

5. The process in accordance with claim 4 in which said gum is chosen from the class consisting of algin gums, pectate gums, cellulose gums, guar gum, arabic gum, tragacanth gum, and karaya gum.

6. The process of claim 4 in which said reducing agent is sulfur dioxide.

7. The process of claim 4 in which said gum is sodium alginate.

8. The process of improving the water dispersibility of a polysaccharide gum in the form of granules of particle size between about 10 mesh and about 200 mesh which comprises: placing said granules in a solution of periodic acid in a liquid chosen from the group which consists of methanol, ethanol, propanol, isopropanol, acetone, methyl ethyl ketone, and dioxane but preferably in mixtures thereof with water; removing said granules from said liquid after a sufficient time has elapsed for surface reaction of said periodic acid with said gum; and thereafter treating said granules with sulfite ion so as to remove residual periodic acid from said granules.

9. The process of claim 8 in which said gum is sodium alginate.

10. As a novel composition of matter, the product obtainable in accordance with the process of claim 1.

11. As a novel composition of matter, the product obtainable in accordance with the process of claim 8.

References Cited by the Examiner
UNITED STATES PATENTS
2,879,268   3/1959   Jullander _____ 260—209 X

OTHER REFERENCES

Goldstein et al., Chem. and Ind., Jan. 11, 1958, pp. 40–42.

Pigman, The Carbohydrates, page 350 (1957).

LEWIS GOTTS, *Primary Examiner.*

NORMA S. MILESTONE, JOHNNIE R. BROWN,
*Assistant Examiners.*